US010831833B2

(12) United States Patent
Harada et al.

(10) Patent No.: US 10,831,833 B2
(45) Date of Patent: Nov. 10, 2020

(54) INFORMATION PROCESSING APPARATUS AND NON-TRANSITORY COMPUTER READABLE MEDIUM

(71) Applicant: FUJI XEROX CO., LTD., Tokyo (JP)

(72) Inventors: Yushi Harada, Kanagawa (JP); Eiji Miyamae, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 243 days.

(21) Appl. No.: 15/688,020

(22) Filed: Aug. 28, 2017

(65) Prior Publication Data

US 2018/0267966 A1    Sep. 20, 2018

(30) Foreign Application Priority Data

Mar. 15, 2017    (JP) ................. 2017-049536

(51) Int. Cl.
| | | |
|---|---|---|
| *G06F 16/25* | (2019.01) | |
| *G06F 16/93* | (2019.01) | |
| *G06F 16/954* | (2019.01) | |
| *G06F 16/904* | (2019.01) | |
| *H04L 12/58* | (2006.01) | |

(52) U.S. Cl.
CPC ............ *G06F 16/93* (2019.01); *G06F 16/258* (2019.01); *G06F 16/904* (2019.01); *G06F 16/954* (2019.01); *H04L 51/066* (2013.01)

(58) Field of Classification Search
CPC .............................. G06F 17/211; G06F 16/258
See application file for complete search history.

(56) References Cited

U.S. PATENT DOCUMENTS

| | | | |
|---|---|---|---|
| 8,656,046 B2 * | 2/2014 | Barger | ................... G06F 17/27 |
| | | | 709/236 |
| 2002/0035576 A1 | 3/2002 | Kishimoto et al. | |
| 2013/0198600 A1 * | 8/2013 | Lockhart | ............... G06F 17/241 |
| | | | 715/230 |
| 2014/0108897 A1 * | 4/2014 | Boutelle | ............... G06F 17/214 |
| | | | 715/201 |
| 2014/0132978 A1 * | 5/2014 | Igawa | ................... G06F 3/1207 |
| | | | 358/1.14 |
| 2014/0201625 A1 * | 7/2014 | Scrocchi | ............. G06F 17/2247 |
| | | | 715/255 |
| 2016/0092446 A1 * | 3/2016 | Nye | ......................... G06T 3/00 |
| | | | 705/3 |

FOREIGN PATENT DOCUMENTS

JP    2002-082887 A    3/2002

* cited by examiner

*Primary Examiner* — Robert W Beausoliel, Jr.
*Assistant Examiner* — Nirav K Khakhar
(74) *Attorney, Agent, or Firm* — Oliff PLC (57) ABSTRACT

An information processing apparatus includes an obtaining unit and a converter. The obtaining unit obtains information regarding a browsing program in a terminal trying to browse a document. The converter converts the document to a format browseable with the browsing program in a case where the document is not browseable on the terminal.

6 Claims, 11 Drawing Sheets

| FORMAT (PRE-CONVERSION) | FORMAT (POST-CONVERSION) | DEGREE OF MATCH | FILE SIZE |
|---|---|---|---|
| | | | |

| LOG ID | CLIENT TERMINAL ID | OPERATOR | CONTENT | BROWSING APPLICATION | BROWSED PAGE(S) |
|---|---|---|---|---|---|
| | | | | | |

| USER | USED TERMINAL ID | GROUP |
|---|---|---|
|  |  |  |

FIG. 10

| PRIORITY | DEGREE OF MATCH | FILE SIZE | FREQUENCY OF USE | APPLICATION |
|---|---|---|---|---|
|  |  |  |  |  |

| CONTENT REQUESTED TO BE BROWSED | TERMINAL INFORMATION | |
|---|---|---|
| | NUMBER OF APPLICATIONS | APPLICATION |
| FUNCTION SPECIFICATION.pdf | 1 | Mmmmssss Offfff Word |
| FUNCTION SPECIFICATION.pdf | 1 | Mmmmmsss Offfff Eeeee |
| FUNCTION SPECIFICATION.pdf | 1 | Mmmmmsssss Offfff PpppppPpppp |

FIG. 14C

| APPLICATION | BROWSEABLE FORMAT |
|---|---|
| Addbb Reader | application/pdf |
| Mmmmsss Offfff Word (doc,dot) | application/msword |
| Mmmmmsss Offfff Eeeee (xls,xlsx) | application/vnd.ope nxmlformats-officedocument.... |
| ... | ... |

FIG. 14D

| PRIORITY | DEGREE OF MATCH | FILE SIZE | FREQUENCY OF USE | APPLICATION |
|---|---|---|---|---|
| 1 | 95% | 150 KB | 1000 TIMES | Mmmmmsss Offfff Word |
| 2 | 90% | 300 KB | 50 TIMES | Mmmmmsss Offfff Eeeee |
| ... | ... | ... | ... | ... |

FIG. 15

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-049536 filed Mar. 15, 2017.

BACKGROUND

(i) Technical Field

The present invention relates to an information processing apparatus and a non-transitory computer readable medium.

(ii) Related Art

Documents are browsed on terminals. There are various formats of documents, and each format has a corresponding browsing program. When a terminal is not equipped with a browsing program for the format of a document, the document is not browseable on the terminal.

SUMMARY

According to an aspect of the invention, there is provided an information processing apparatus including an obtaining unit and a converter. The obtaining unit obtains information regarding a browsing program in a terminal trying to browse a document. The converter converts the document to a format browseable with the browsing program in a case where the document is not browseable on the terminal.

BRIEF DESCRIPTION OF THE DRAWINGS

An exemplary embodiment of the present invention will be described in detail based on the following figures, wherein.

DETAILED DESCRIPTION

Hereinafter, an exemplary embodiment of the present invention will be described on the basis of the drawings.

Figure 1:
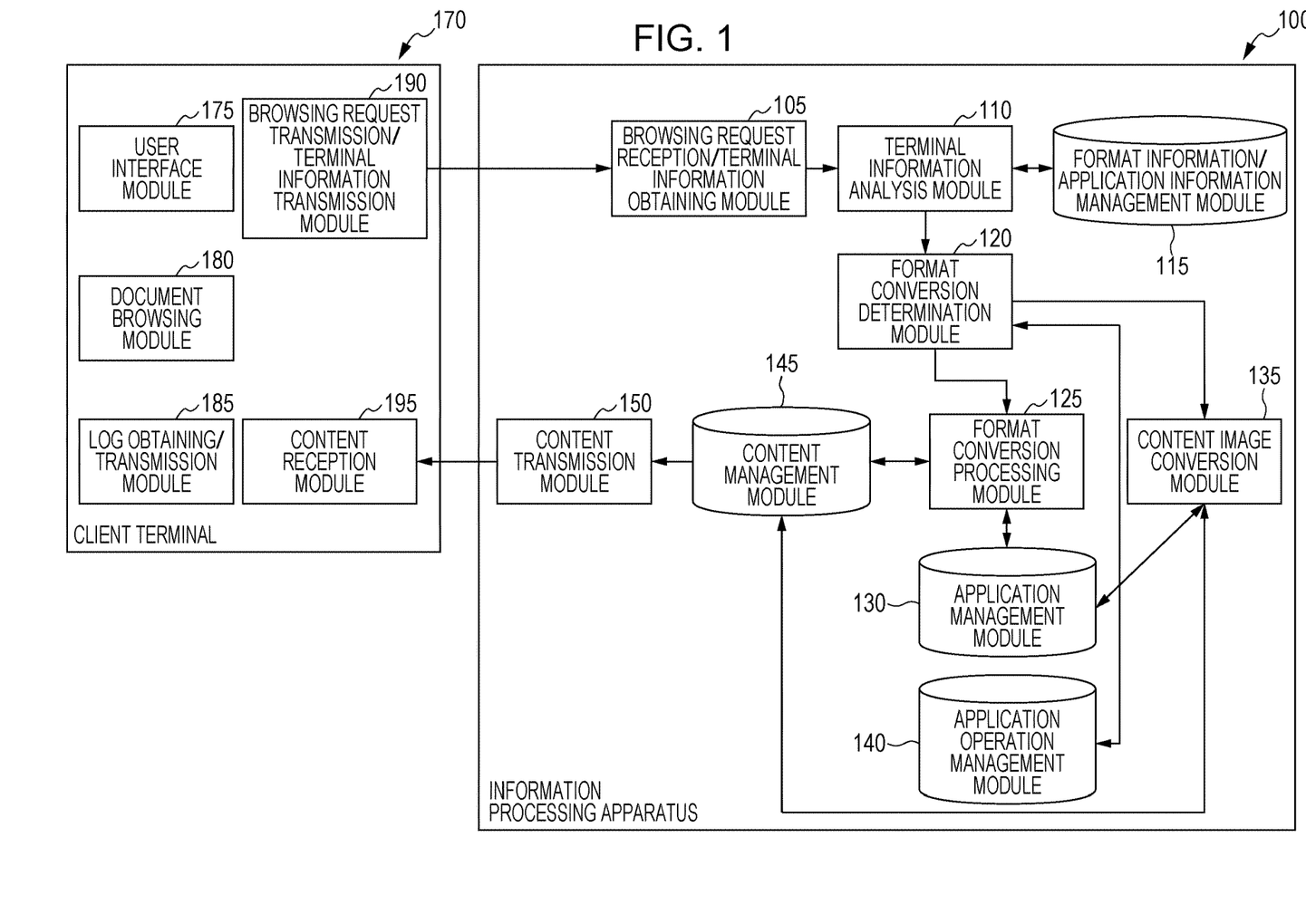
FIG. 1 is a conceptual module diagram of an exemplary configuration according to an exemplary embodiment.

FIG. 1 is a conceptual module diagram of an exemplary configuration according to the exemplary embodiment.

Note that the term "module" refers to components such as software (computer programs) and hardware which are typically capable of being logically separated. Consequently, the term "module" in the exemplary embodiment not only refers to modules in a computer program, but also to modules in a hardware configuration. Thus, the exemplary embodiment also serves as a description of a computer program (a program that causes a computer to execute respective operations, a program that causes a computer to function as respective units, or a program that causes a computer to realize respective functions), a system, and a method for inducing functionality as such modules. Note that although terms like "store" and "record" and their equivalents may be used in the description for the sake of convenience, these terms mean that a storage device is made to store information or that control is applied to cause a storage device to store information in the case where the exemplary embodiment is a computer program. Also, while modules may be made to correspond with function on a one-to-one basis, some implementations may be configured such that one program constitutes one module, such that one program constitutes multiple modules, or conversely, such that multiple programs constitute one module. Moreover, multiple modules may be executed by one computer, but one module may also be executed by multiple computers in a distributed or parallel computing environment. Note that a single module may also contain other modules. Also, the term "connection" may be used hereinafter to denote logical connections (such as the transfer of data and referential relationships between instructions and data) in addition to physical connections. The term "predetermined" refers to something being determined prior to the processing in question, and obviously denotes something that is determined before a process according to the exemplary embodiment starts, but may also denote something that is determined after a process according to the exemplary embodiment has started but before the processing in question, according to conditions or states at that time, or according to conditions or states up to that time. In the case of multiple "predetermined values", the predetermined values may be respectively different values, or two or more values (this obviously also includes the case of all values) which are the same. Additionally, the statement "B is conducted in the case of A" is used to denote that a determination is made regarding whether or not A holds true, and B is conducted in the case where it is determined that A holds true. However, this excludes cases where the determination of whether or not A holds true may be omitted. Also, the case where things are listed as in the phrase "A, B, and C" serves as exemplary listing unless otherwise noted, and includes the case where only one of the listed things (such as only A) is selected.

Also, the terms "system" and "device" not only encompass configurations in which multiple computers, hardware, or devices are connected by a communication medium such as a network (including connections that support 1-to-1 communication), but also encompass configurations realized by a single computer, hardware, or device. The terms "device" and "system" are used interchangeably. Obviously, the term "system" does not include merely artificially arranged social "constructs" (social systems).

Also, every time a process is conducted by each module or every time multiple processes are conducted within a module, information to be processed is retrieved from a storage device, and the processing results are written back to the storage device after the processing. Consequently, description of the retrieval from a storage device before processing and the writing back to a storage device after processing may be reduced or omitted in some cases. Note that the storage device herein may include a hard disk, random-access memory (RAM), an auxiliary or external storage medium, a storage device accessed via a communication link, and a register or the like inside a central processing unit (CPU).

Before the description of the exemplary embodiment, the assumption thereof or an information processing apparatus using the exemplary embodiment will be described. Note that the description is intended to facilitate the understanding of the exemplary embodiment.

The technology described in Japanese Unexamined Patent Application Publication No. 2002-082887 assumes that applications (such as Adobe Reader) that are general among applications in client terminals are installed. Therefore, a client terminal where these applications are not installed is unable to browse documents even when their format is converted.

For example, because a document that matches a preset format in a mail server is converted to a preset standard format, if a document does not match the preset format or if it becomes necessary to convert the format of a document to a format other than the standard format, the document is not browseable on a client terminal. Therefore, it is necessary to find an application for browsing the document and to perform an operation to install the application.

An information processing apparatus 100, which is the exemplary embodiment, causes a user of a client terminal 170 to browse a document. As illustrated in the example in FIG. 1, the information processing apparatus 100 includes a browsing request reception/terminal information obtaining module 105, a terminal information analysis module 110, a format information/application information management module 115, a format conversion determination module 120, a format conversion processing module 125, an application management module 130, a content image conversion module 135, an application operation management module 140, a content management module 145, and a content transmission module 150.

The information processing apparatus 100 and the client terminal 170 are connected through a communication link.

As a specific example, the information processing apparatus 100 analyzes information on a browsing program (may also be referred to as an application hereinafter) installed in the client terminal 170, and converts the format of a document to a browseable format suitable for the client terminal 170 in accordance with the priority of each format calculated by the information processing apparatus 100. When the client terminal 170 is not equipped with a browsing program for browsing a document, the document is converted to image information, which enables browsing of the document using a browser for the Internet or an image viewer installed as default in the client terminal 170 (such as a personal computer or a mobile terminal in particular). Here, it is assumed that a browser for the Internet and an image viewer are not browsing programs for browsing documents.

In this case, a document (may also be referred to as a file or content; hereinafter may be referred to as content) includes text data, numerical data, graphical data, image data, moving image data, audio data, or any combination thereof. Content is to be stored, edited, and retrieved. Content is exchangeable as an individual unit between systems or users, and includes any identical or substantially similar unit. Specifically, content includes a document created by a document creating program, an image read by an image reading device (such as a scanner), a web page, and the like.

The browsing request reception/terminal information obtaining module 105 is connected to the terminal information analysis module 110, and to a browsing request transmission/terminal information transmission module 190 of the client terminal 170. The browsing request reception/terminal information obtaining module 105 receives a request for browsing a document from the browsing request transmission/terminal information transmission module 190 of the client terminal 170 through a communication link. The browsing request reception/terminal information obtaining module 105 obtains, from the browsing request transmission/terminal information transmission module 190 of the client terminal 170, information regarding a browsing program in the client terminal 170 which is trying to browse the document. The "information regarding a browsing program" includes information by which the format of a document that is browseable using that browsing program may be directly or indirectly derived, which is, specifically, the program name, information indicating the type of program, and the format of a document browseable using the browsing program. A specific example of information received by the browsing request reception/terminal information obtaining module 105 from the browsing request transmission/terminal information transmission module 190 includes browsing request information 500, which will be described later using the example illustrated in FIG. 5.

The terminal information analysis module 110 is connected to the browsing request reception/terminal information obtaining module 105, the format information/application information management module 115, and the format conversion determination module 120. The terminal information analysis module 110 analyzes a format that is browseable on the client terminal 170 on the basis of information on a browsing program installed in the client terminal 170 and information stored in the format information/application information management module 115.

The format information/application information management module 115 is connected to the terminal information analysis module 110. The format information/application information management module 115 is accessed by the terminal information analysis module 110 and stores information necessary for processing performed by the terminal information analysis module 110. In short, the format information/application information management module 115 manages format information of various documents and browsing program information for browsing these documents. For example, the format information/application information management module 115 stores the correspondence between "information regarding a browsing program" and a document format. More specifically, the format information/application information management module 115 stores a format/application correspondence table 600, which will be described later using the example illustrated in FIG. 6.

The format conversion determination module 120 is connected to the terminal information analysis module 110, the format conversion processing module 125, the content image conversion module 135, and the application operation management module 140. The format conversion determination module 120 determines which of the following will be performed: conversion of content to a format that is browseable on the client terminal 170; and conversion of content to image information when there is no format that is displayable on the client terminal 170. When the client terminal 170 is equipped with multiple browsing programs capable of browsing content, the format conversion determination module 120 calculates the priority of each of the browsing programs from the degree of match between the details of a document before and after the format conversion (text conversion, the clarity of figures, and the like), the document size after the format conversion, and the frequency of use of each browsing program on the client terminal 170, and determines to convert the content to a format with high priority.

The format conversion processing module 125 is connected to the format conversion determination module 120, the application management module 130, and the content management module 145. The format conversion processing module 125 converts a document to a format that is browseable on the client terminal 170.

In short, when a document for which a browsing request has been received by the browsing request reception/terminal information obtaining module 105 is not browseable on the client terminal 170, the format conversion processing module 125 converts the document to a format that is browseable using a browsing program in the client terminal 170. Here, the statement "when a document is not browseable on a terminal" means that a browsing program included in the terminal does not correspond to the format of the document of interest to be browsed, and accordingly the document is not browseable on the terminal.

When the client terminal 170 is equipped with multiple browsing programs, the format conversion processing module 125 may convert a document of interest to a format that has a high degree of match between the details of a pre-conversion document and the details of a post-conversion document.

When the client terminal 170 is equipped with multiple browsing programs, the format conversion processing module 125 may convert a document of interest to a format where the size of a post-conversion document is smaller.

When the client terminal 170 is equipped with multiple browsing programs, the format conversion processing module 125 may convert a document of interest to a format to which a browsing program with a high frequency of use corresponds.

The format conversion processing module 125 may determine a post-conversion format using a combination of at least two of the following: the degree of match between the details of a pre-conversion document and the details of a post-conversion document, the size of the post-conversion document, and the frequency of use of each browsing program.

The application management module 130 is connected to the format conversion processing module 125 and the content image conversion module 135. The application management module 130 is accessed by the format conversion processing module 125 and the content image conversion module 135, and stores information necessary for processing performed by the format conversion processing module 125 and the content image conversion module 135. In short, the application management module 130 stores a browsing program capable of browsing various documents. The application management module 130 may store information for calculating priority, which is necessary for the conversion. More specifically, the application management module 130 stores a format conversion table 700, which will be described later using the example illustrated in FIG. 7.

The content image conversion module 135 is connected to the format conversion determination module 120, the application management module 130, and the content management module 145. The content image conversion module 135 converts a document of interest to an image when there is no browsing program. For example, the content image conversion module 135 may display a document of interest on a display device (may be a virtual display device realized on software) using a browsing program that is browseable in the information processing apparatus 100, obtain a screenshot of each page of the document, and convert the screenshot to image information. Additionally, the content image conversion module 135 may convert only one or more pages that one or more members belonging to the same group as a user of interest have browsed (see a browsed page column 830 of a log information table 800 described later using FIG. 8) to image information.

The application operation management module 140 is connected to the format conversion determination module 120. The application operation management module 140 is accessed by the format conversion determination module 120, and stores information necessary for processing performed by the format conversion determination module 120. In short, the application operation management module 140 stores the log of operations performed on each document, information regarding each user, and the priority calculation result. More specifically, the application operation management module 140 stores the log information table 800, which will be described later using the examples illustrated in FIGS. 8 to 10, a user information table 900, and a priority table 1000.

The content management module 145 is connected to the format conversion processing module 125, the content image conversion module 135, and the content transmission module 150. The content management module 145 stores a document of interest to be browsed (including a document converted by the format conversion processing module 125). More specifically, the content management module 145 stores a content information table 1100, which will be described later using the example illustrated in FIG. 11.

The content transmission module 150 is connected to the content management module 145, and to a content reception module 195 of the client terminal 170. The content transmission module 150 transmits a document to be browsed on the client terminal 170 to the content reception module 195 of the client terminal 170 through a communication link.

The client terminal 170 includes a user interface module 175, a document browsing module 180, a log obtaining/transmission module 185, the browsing request transmission/terminal information transmission module 190, and the content reception module 195. The client terminal 170 is a personal computer, a mobile terminal, or the like which is capable of communicating with the information processing apparatus 100. The client terminal 170 may be any device other than a personal computer or a mobile terminal as long as it has the ability to communicate with the information processing apparatus 100 and to browse a document (at least a document as an image), and may be a multifunctional peripheral (an image processing apparatus with at least two of the following functions: scanner, printer, photocopier, and fax machine).

The user interface module 175 controls a display device such as a liquid crystal display serving also as a touchscreen to receive a user operation and to present a message or the like to the user. Additionally, the user interface module 175 may receive a user operation (including glance, gesture, and voice) using a mouse, a keyboard, a camera, a microphone, or the like, or may present a message to the user by means of an audio output using a loudspeaker or the sense of touch using a haptic device.

In accordance with a user operation received by the user interface module 175, the document browsing module 180 displays, on a display device, a document received by the content reception module 195, using a browsing program included in the client terminal 170.

The log obtaining/transmission module 185 obtains the log of operations performed on a user's document received by the user interface module 175, and transmits the log to the information processing apparatus 100. The log is stored in the application operation management module 140. Specifically, the log is, for example, the log information table 800, which will be described later using the example illustrated in FIG. 8.

The browsing request transmission/terminal information transmission module 190 is connected to the browsing request reception/terminal information obtaining module 105 of the information processing apparatus 100 through a communication link. In accordance with a user operation received by the user interface module 175, the browsing request transmission/terminal information transmission module 190 transmits a document browsing request from the client terminal 170 to the information processing apparatus 100 through a communication link. The browsing request transmission/terminal information transmission module 190 transmits information regarding a browsing program, which is included in the browsing request transmission/terminal information transmission module 190.

The content reception module 195 is connected to the content transmission module 150 of the information processing apparatus 100 through a communication link. The content reception module 195 receives a browseable document from the content transmission module 150 of the information processing apparatus 100 through a communication link. The document browsing module 180 displays that document.

Figure 2:
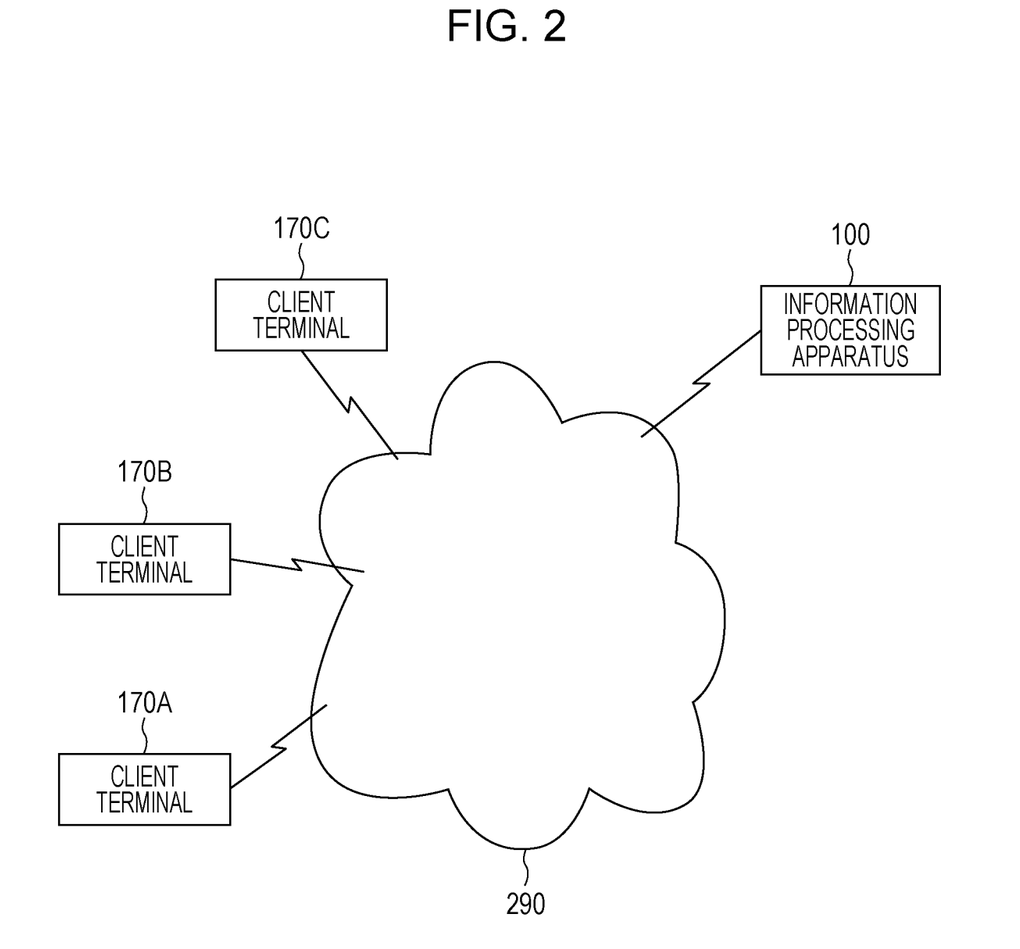
FIG. 2 is a diagram illustrating an exemplary system configuration using the exemplary embodiment.

FIG. 2 is a diagram illustrating an exemplary system configuration using the first exemplary embodiment.

The information processing apparatus 100, a client terminal 170A, a client terminal 170B, and a client terminal 170C are connected to one another through a communication link 290. The communication link 290 may be wireless, wired, or a combination thereof. Examples of the communication link 290 include the Internet serving as a communication infrastructure, and an intranet. The functions of the information processing apparatus 100 may be implemented as cloud services.

Using the client terminal 170, the user browses a document stored in the information processing apparatus 100. Browsing (displaying) of a document itself is performed on the client terminal 170; thus, a document downloaded from the information processing apparatus 100 is subjected to processing based on a browsing program included in the client terminal 170. However, the client terminal 170 does not necessarily have a browsing program capable of browsing that document. In that case, the format of the document is converted by the information processing apparatus 100.

The individual client terminals 170 may be operated by users who belong to the same group. The post-conversion format is determined using the log of operations performed by a user of interest on a document, and the log of operations performed by one or more users belonging to the same group on that document. For example, when the same document is displayed differently for users belonging to the same group because of differences in browsing programs, these users may not be able to communicate well with each other.

Figure 3:
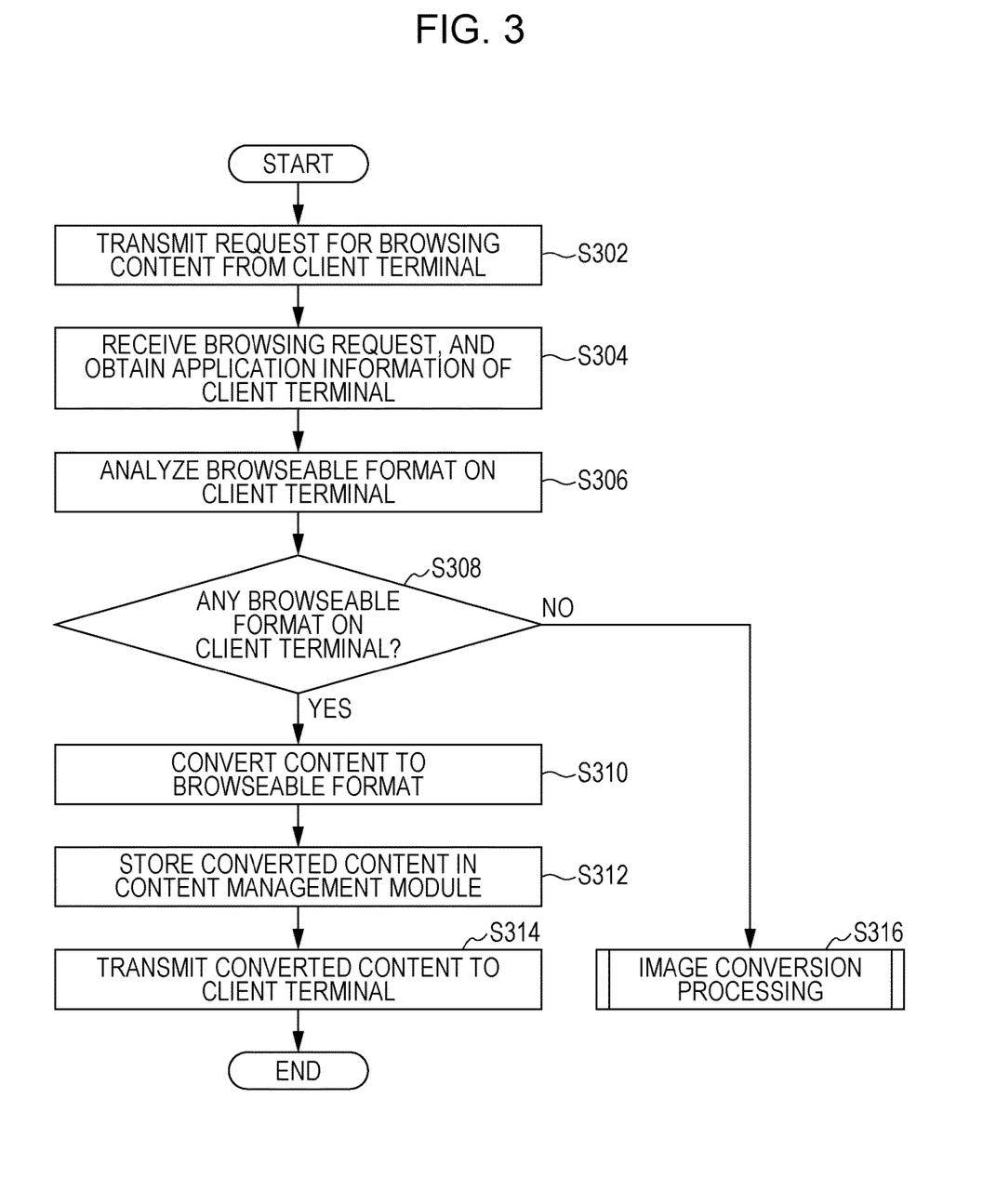
FIG. 3 is a flowchart illustrating an exemplary process according to the exemplary embodiment.

FIG. 3 is a flowchart illustrating an exemplary process according to the exemplary embodiment.

In step S302, a content browsing request is transmitted from the client terminal 170 in accordance with a user operation.

In step S304, the browsing request reception/terminal information obtaining module 105 of the information processing apparatus 100 receives the browsing request, and obtains application information of the client terminal 170. For example, the browsing request transmission/terminal information transmission module 190 of the client terminal 170 transmits the browsing request information 500 to the browsing request reception/terminal information obtaining module 105 of the information processing apparatus 100.

Figure 5:
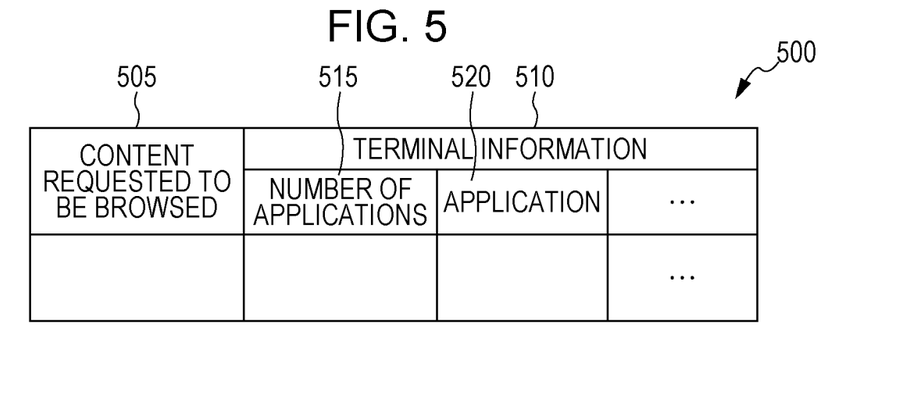
FIG. 5 is a diagram illustrating an exemplary data structure of browsing request information.

FIG. 5 is a diagram illustrating an exemplary data structure of the browsing request information 500. The browsing request information 500 includes a browsing request content column 505 and a terminal information column 510. The terminal information column 510 includes a number-of-application column 515 and an application column 520. The browsing request content column 505 stores information indicating content requested to be browsed (such as the document name or the content identification (ID)). The terminal information column 510 stores information regarding a client terminal 170 that has transmitted the browsing request (information regarding browsing of content on the client terminal 170). The number-of-application column 515 stores the number of applications that are installed in the client terminal 170 and that are capable of browsing content. After this column 515, application columns 520 whose number is the number of applications follows. Each application column 520 stores that application (such as the application name or the application ID).

In step S306, the terminal information analysis module 110 analyzes a browseable format on the client terminal 170. For example, a browseable format is determined using the format/application correspondence table 600 from information in the application column(s) 520 of the browsing request information 500.

Figure 6:
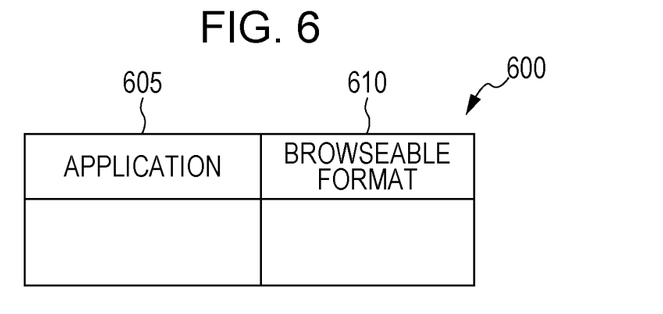
FIG. 6 is a diagram illustrating an exemplary data structure of a format/application correspondence table.

FIG. 6 is a diagram illustrating an exemplary data structure of the format/application correspondence table 600. The format/application correspondence table 600 is stored in the format information/application information management module 115. The format/application correspondence table 600 includes an application column 605 and a browseable format column 610. The application column 605 stores an application. The browseable format column 610 stores the format of content browseable using that application (such as the format name or the format ID). Multiple formats may be stored. Specifically, the application column 605 is searched for information in the application column(s) 520, and information in the browseable format column 610 that corresponds to the retrieved information is a browseable format on the client terminal 170.

In step S308, the format conversion determination module 120 determines whether there is a browseable format on the client terminal 170, and if the determination is affirmative, the process proceeds to step S310; if not, the process proceeds to step S316.

In step S310, the format conversion processing module 125 converts the content to the browseable format. Existing techniques may be used for the format conversion.

When multiple browsing programs are installed in the client terminal 170 (this is the same as the case where there are multiple browseable formats), the following processing may be performed.

The post-conversion format may be determined using one or a combination of at least two of the following: (1) the degree of match between the details of pre-conversion content and the details of post-conversion content, (2) the size of the post-conversion content, and (3) the frequency of use of each browsing program.

Hereinafter, (1) to (3) will be described.

Figure 7:
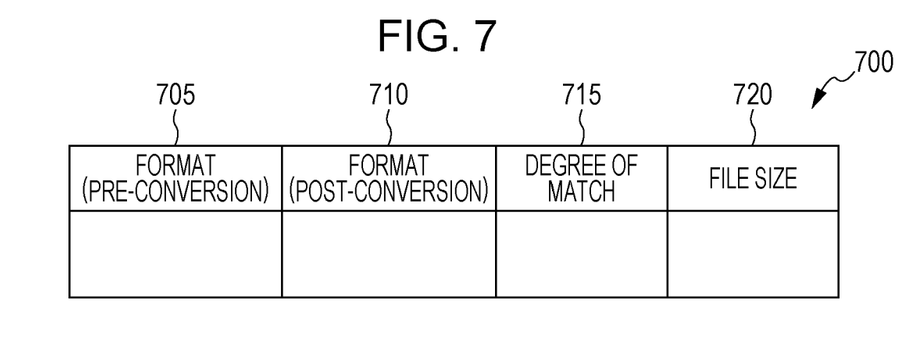
FIG. 7 is a diagram illustrating an exemplary data structure of a format conversion table.

(1) Content is converted to a format that has a high degree of match between the details of pre-conversion content and the details of post-conversion content. In short, priority is calculated from the degree of match between the details of content before and after the format conversion, and content is converted to a format with high priority. Examples of the degree of match include text conversion and the clarity of figures. For example, a browseable format is determined using the format conversion table 700 from information in the application column(s) 520 of the browsing request information 500.

FIG. 7 is a diagram illustrating an exemplary data structure of the format conversion table 700. The format conversion table 700 is stored in the application management module 130. The format conversion table 700 includes a format (pre-conversion) column 705, a format (post-conversion) column 710, a degree of match column 715, and a file size column 720. The format (pre-conversion) column 705 stores a pre-conversion format. The format (post-conversion) column 710 stores a post-conversion format. The degree of match column 715 stores the degree of match in the case where the pre-conversion format is converted to the post-conversion format. The file size column 720 stores the file size of post-conversion content in the case where the pre-conversion format is converted to the post-conversion format.

The degree of match column 715 stores, for example, the rate of complete match between items of content before and after the conversion. In short, the degree of match column 715 indicates, when content in a format in the format (pre-conversion) column 705 is converted to content in a format in the format (post-conversion) column 710, the rate as to how much the details of the content in the format in the format (post-conversion) column 710 are reflected in the content in the format in the format (pre-conversion) column 705. For example, the degree of match may be stored for every type of data in the content (such as characters, figures, images, and the like). Specifically, regarding the characters, the degree of match is calculated in accordance with the correspondence of character code between the formats, typefaces, and character properties such as character size. Regarding the figures, the degree of match is calculated in accordance with the method of representing the figures, data structures, and the like. Regarding the images, the degree of match is calculated in accordance with the method of representing the images (such as the color space employed), compression method, and the like. Not only the rate of complete match serving as the degree of match, but also a value using the degree of similarity may be used for similar pieces of content.

Alternatively, instead of using the format conversion table 700, the conversion may be actually performed to calculate the degree of match between the details of content before and after the conversion.

(2) Content is converted to a format where the content size after the conversion is smaller. In short, priority is calculated from the file size after the format conversion, and content is converted to a format with high priority. For example, a browseable format is determined using the format conversion table 700 from information in the application column(s) 520 of the browsing request information 500.

The file size column 720 of the format conversion table 700 stores, for example, a magnification. In short, the magnification indicates, when content in a format in the format (pre-conversion) column 705 is converted to content in a format in the format (post-conversion) column 710, how many times the capacity of the content in the format in the format (post-conversion) column 710 is greater than the content in the format in the format (pre-conversion) column 705. For example, the magnification may be stored for every type of data in the content (such as characters, figures, images, and the like).

Alternatively, instead of using the format conversion table 700, the conversion may be actually performed to calculate the file size after the conversion.

(3) Content is converted to a format to which a browsing program with a high frequency of use corresponds. In short, priority is calculated from the frequency of use of each browsing program in the client terminal 170, and content is converted to a format with high priority. For example, a browseable format is determined using the usage log of each browsing program in the client terminal 170 from information in the application column(s) 520 of the browsing request information 500.

Figure 8:
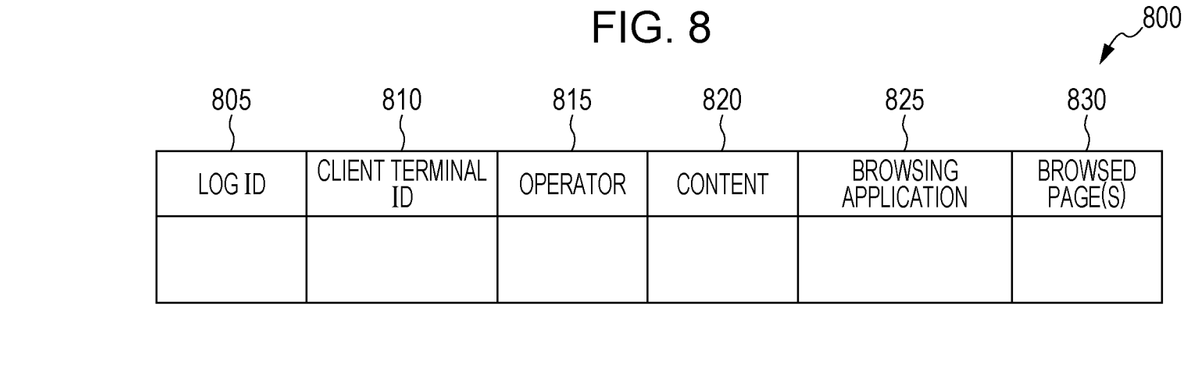
FIG. 8 is a diagram illustrating an exemplary data structure of a log information table.

As the usage log, the log information table 800 may be obtained from the client terminal 170. FIG. 8 is a diagram illustrating an exemplary data structure of the log information table 800. The log information table 800 is stored in the application operation management module 140. The log information table 800 includes a log ID column 805, a client terminal ID column 810, an operator column 815, a content column 820, a browsing application column 825, and the browsed page column 830. The log ID column 805 stores information (log ID) for uniquely identifying a log in the exemplary embodiment. The client terminal ID column 810 stores information (client terminal ID) for uniquely identifying a client terminal in the exemplary embodiment. The operator column 815 stores an operator (user ID or the like) who has performed operations in that log. The content column 820 stores content of interest (content ID or the like) for which the operations have been performed. The browsing application column 825 stores a browsing application with which the operations have been performed. The browsed page column 830 indicates one or more pages that have been browsed in the operations. Each browsing application may display content and store a procedure of displaying the pages of content (the order of browsed pages).

The number of times of use of each browsing application in the browsing application column 825 may be counted, and the counted number may be calculated as the frequency of use. Alternatively, the number of times of use within a predetermined period may be counted, and the counted number may be calculated as the frequency of use.

Figure 9:
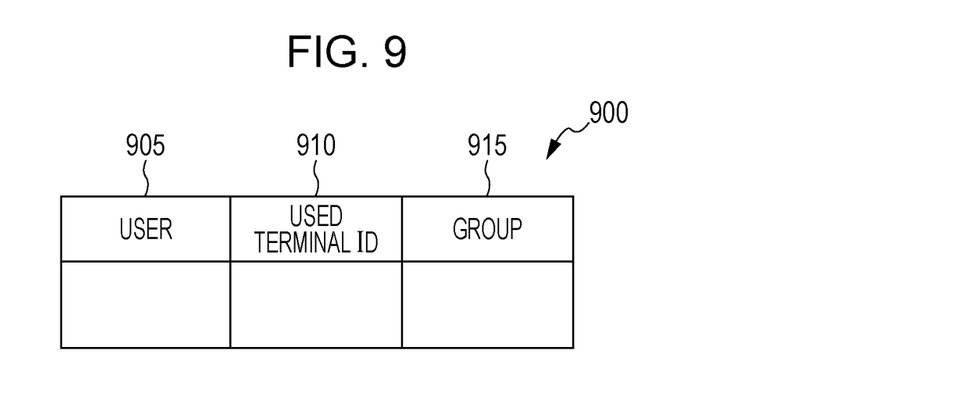
FIG. 9 is a diagram illustrating an exemplary data structure of a user information table.

Furthermore, the number of times of use by one or more members (other users) belonging to the same group as that user may be counted, and the numbers may be added to calculate the frequency of use. For example, using the user information table 900, one or more users belonging to the same group as the user of interest may be extracted. FIG. 9 is a diagram illustrating an exemplary data structure of the user information table 900. The user information table 900 is stored in the application operation management module 140. The user information table 900 includes a user column 905, a used terminal ID column 910, and a group column 915. The user column 905 stores a user (user ID or the like). The used terminal ID column 910 stores the ID of a client terminal 170 used by that user. The group column 915 stores a group (group ID or the like) to which that user belongs.

Figure 10:
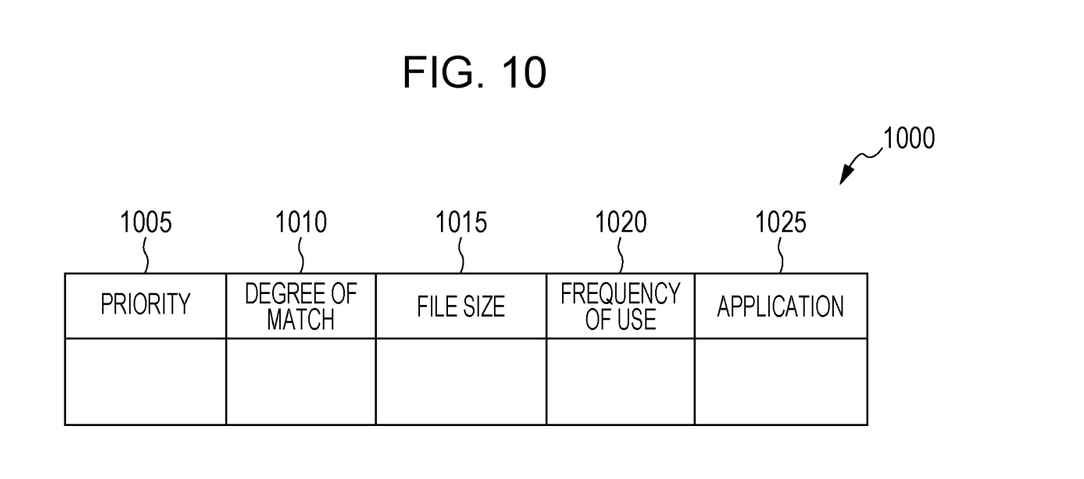
FIG. 10 is a diagram illustrating an exemplary data structure of a priority table.

For example, the priority table 1000 is generated, and a post-conversion format is determined. FIG. 10 is a diagram illustrating an exemplary data structure of the priority table 1000. The priority table 1000 includes a priority column 1005, a degree of match column 1010, a file size column 1015, a frequency of use column 1020, and an application column 1025. The priority column 1005 stores priority. The degree of match column 1010 may store the degree of match in the case of an application stored in the application column 1025. The file size column 1015 stores the file size of post-conversion content in the case of a browsing application stored in the application column 1025. The frequency of use column 1020 stores the frequency of use of the browsing application stored in the application column 1025 by the user or one or more group members. The application column 1025 stores the browsing application.

When the degree of match in the degree of match column 1010 is high, the file size in the file size column 1015 is small, or the frequency of use in the frequency of use column 1020 is high, the priority of the browsing application in the priority column 1005 is increased.

For example, the degree of match column 1010 may store the rank position of the degree of match (the rank position in descending order of the degree of match) in the case of an application stored in the application column 1025. The file size column 1015 may store the rank position of the file size of post-conversion content (the rank position in ascending order of the file size) in the case of an application stored in the application column 1025. The frequency of use column 1020 may store the rank position of the frequency of use (the rank position in descending order of the frequency of use) of an application stored in the application column 1025 by the user or one or more group members.

For example, as the priority in the priority column 1005, the values (rank positions) stored in the degree of match column 1010, the file size column 1015, and the frequency of use column 1020 may be added to calculate the rank position in ascending order of the addition result. In the addition, each rank position may be weighted. Note that the smaller the value of the priority (the priority rank), the more likely the application is to be selected.

In the case where only the above-described (1) is used, the file size column 1015 and the frequency of use column 1020 are unnecessary, and the value in the degree of match column 1010 directly becomes the value in the priority column 1005. In the case where only the above-described (2) is used, the degree of match column 1010 and the frequency of use column 1020 are unnecessary, and the value in the file size column 1015 directly becomes the value in the priority column 1005. In the case where only the above-described (3) is used, the degree of match column 1010 and the file size column 1015 are unnecessary, and the value in frequency of use column 1020 directly becomes the value in the priority column 1005.

Figure 11:
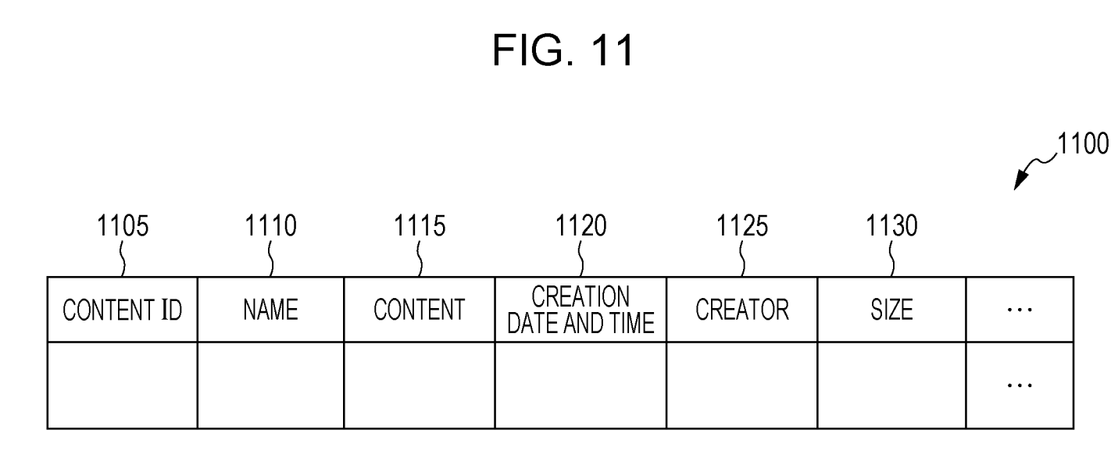
FIG. 11 is a diagram illustrating an exemplary data structure of a content information table.

In step S312, the format conversion processing module 125 stores the converted content in the content management module 145. For example, the converted content is stored in the content information table 1100 to be managed. FIG. 11 is a diagram illustrating an exemplary data structure of the content information table 1100. The content information table 1100 includes a content ID column 1105, a name column 1110, a content column 1115, a creation date and time column 1120, a creator column 1125, a size column 1130, and so forth. The content ID column 1105 stores information (content ID) for uniquely identifying content in the exemplary embodiment. The name column 1110 stores the name of the content. The content column 1115 stores the content (or a Uniform Resource Locator (URL) where the content is stored). The creation date and time column 1120 stores the creation date and time of the content. The creator column 1125 stores the creator of the content. The size column 1130 stores the file size of the content.

In step S314, the content transmission module 150 transmits the converted content to the client terminal 170.

In step S316, image conversion processing is performed. Details of the processing in step S316 will be described later using the flowchart illustrated in the example in FIG. 4.

Figure 4:
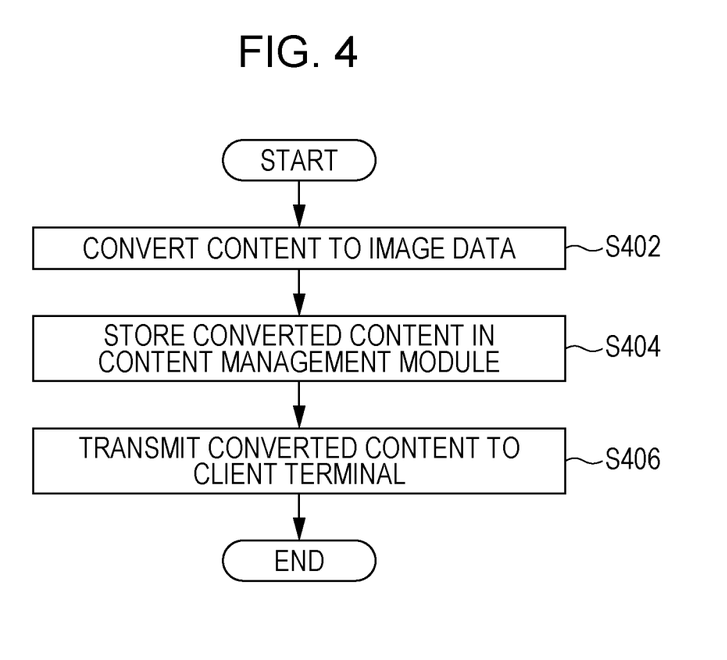
FIG. 4 is a flowchart illustrating an exemplary process according to the exemplary embodiment.

FIG. 4 is a flowchart illustrating an exemplary process according to the exemplary embodiment.

In step S402, the content image conversion module 135 converts content to image data. Existing techniques may be used for image conversion. For example, as has been described above, content may be displayed on a display device using a browsing program in the information processing apparatus 100, and a screenshot of each page of the content may serve as image information.

In step S404, the content image conversion module 135 stores the converted content in the content management module 145.

In step S406, the content transmission module 150 transmits the converted content to the client terminal 170.

Figure 12A:
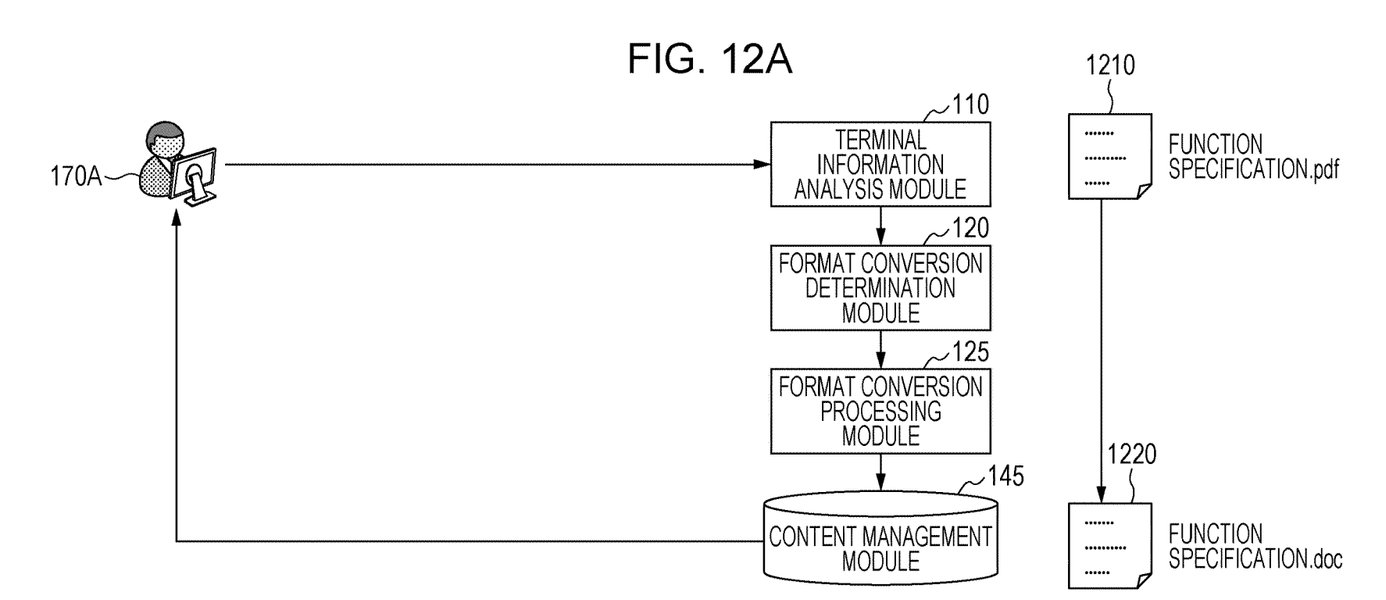
FIGS. 12A to 12C are diagrams illustrating an exemplary process according to the exemplary embodiment.
Figure 12B:
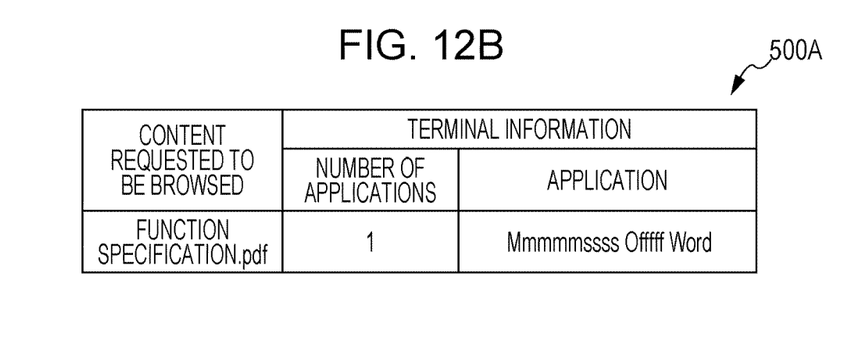
Figure 12C:
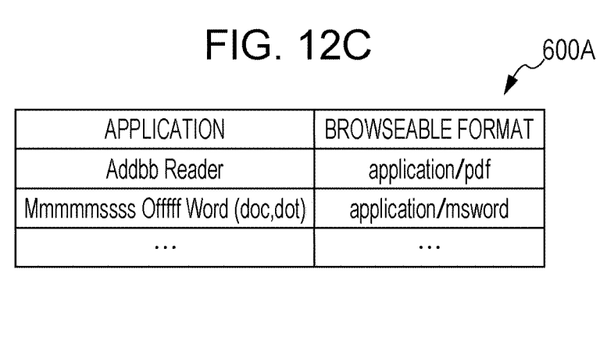

FIGS. 12A to 12C are diagrams illustrating an exemplary process (1) according to the exemplary embodiment.

(12-1) As illustrated in the example in FIG. 12A, the user of the client terminal 170A tries to browse on the client terminal 170A the document "Function Specification. pdf: 1210" in the content management module 145. In this case, browsing request information 500A, illustrated in the example in FIG. 12B, is transmitted from the client terminal 170A to the terminal information analysis module 110.

(12-2) The terminal information analysis module 110 obtains application information of the client terminal 170A, extracts a browseable format from a format/application correspondence table 600A illustrated in the example in FIG. 12C, and gives the browseable format to the format conversion determination module 120.

(12-3) The format conversion determination module 120 determines that the client terminal 170A has no application for browsing the pdf document, and, since the pdf document is browseable using Mmmmmssss Offfff Word on the client terminal 170A, determines to convert the "pdf" document to "doc", which serves as the format conversion method.

(12-4) The format conversion processing module 125 converts "Function Specification. pdf: 1210" to "Function Specification. doc 1220", and stores the converted doc document in the content management module 145.

(12-5) The information processing apparatus 100 transmits the conversion result "Function Specification. doc: 1220" to the client terminal 170A.

Figures 13A, 13B, 13C:
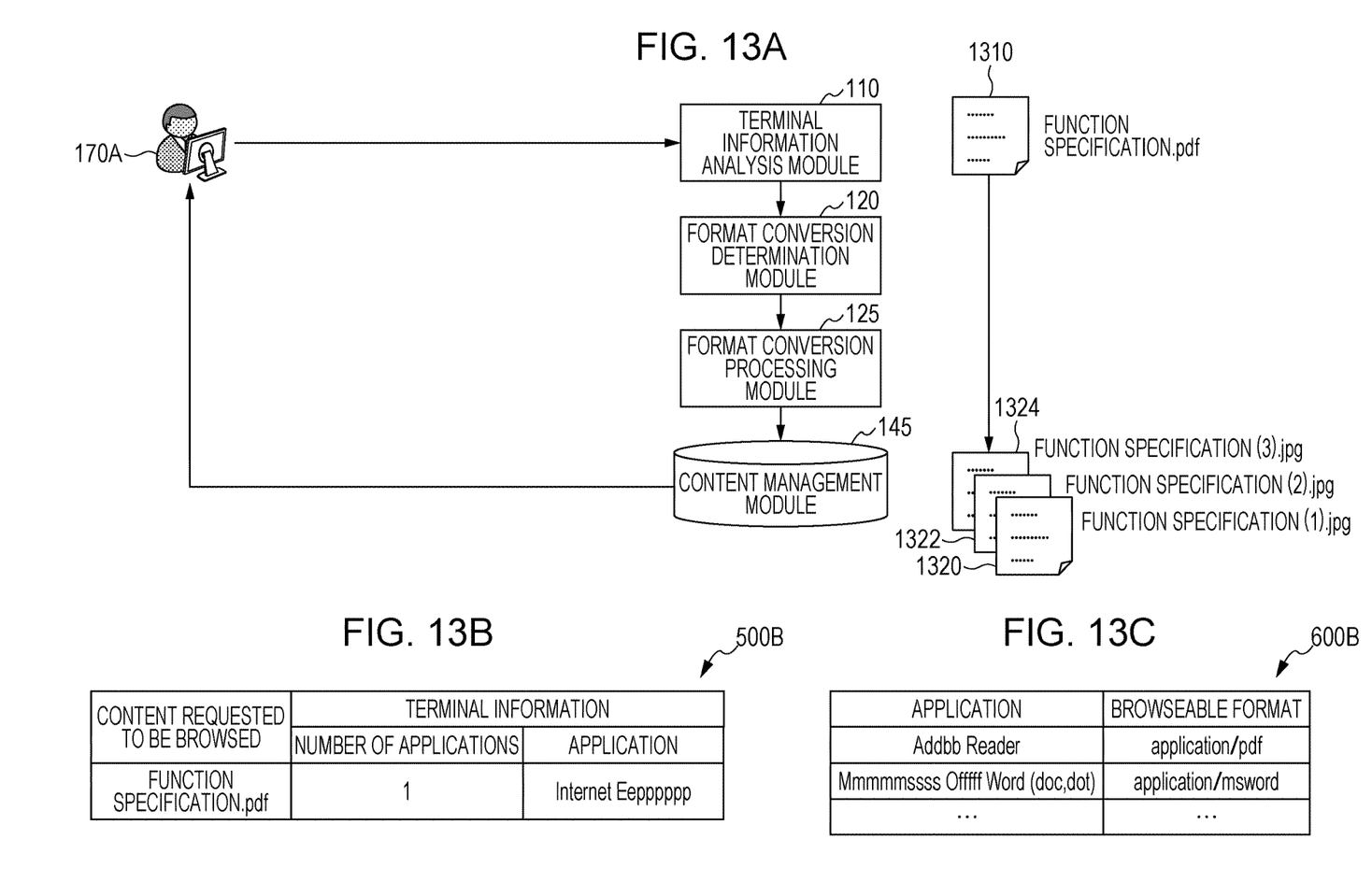
FIGS. 13A to 13C are diagrams illustrating an exemplary process according to the exemplary embodiment.

FIGS. 13A to 13C are diagrams illustrating an exemplary process (2) according to the exemplary embodiment.

(13-1) As illustrated in the example in FIG. 13A, the user of the client terminal 170A tries to browse on the client terminal 170A the document "Function Specification. pdf: 1310" in the content management module 145. In this case, browsing request information 500B, illustrated in the example in FIG. 13B, is transmitted from the client terminal 170A to the terminal information analysis module 110.

(13-2) The terminal information analysis module 110 obtains application information of the client terminal 170A, extracts a browseable format from a format/application correspondence table 600B illustrated in the example in FIG. 13C, and gives the browseable format to the format conversion determination module 120.

(13-3) The format conversion determination module 120 determines that the client terminal 170A has no application for browsing the pdf document.

(13-4) Since the client terminal 170A has Internet Eepppppp, it is determined to convert each page of the "pdf" document to image data "jpg", which serves as the format conversion method. Note that it is assumed that a browser for the Internet and an image viewer are not browsing programs for browsing documents.

(13-5) The format conversion processing module 125 converts "Function Specification. pdf: 1310" to "Function Specification (1). jpg: 1320, Function Specification (2). jpg: 1322, and Function Specification (3). jpg: 1324", and stores the converted images in the content management module 145.

(13-6) The information processing apparatus 100 transmits the conversion result "Function Specification (1). jpg: 1320, Function Specification (2). jpg: 1322, and Function Specification (3). jpg: 1324" to the client terminal 170A.

FIGS. 14A to 14D are diagrams illustrating an exemplary process (3) according to the exemplary embodiment.

Figures 14A, 14B, 14C, 14D:
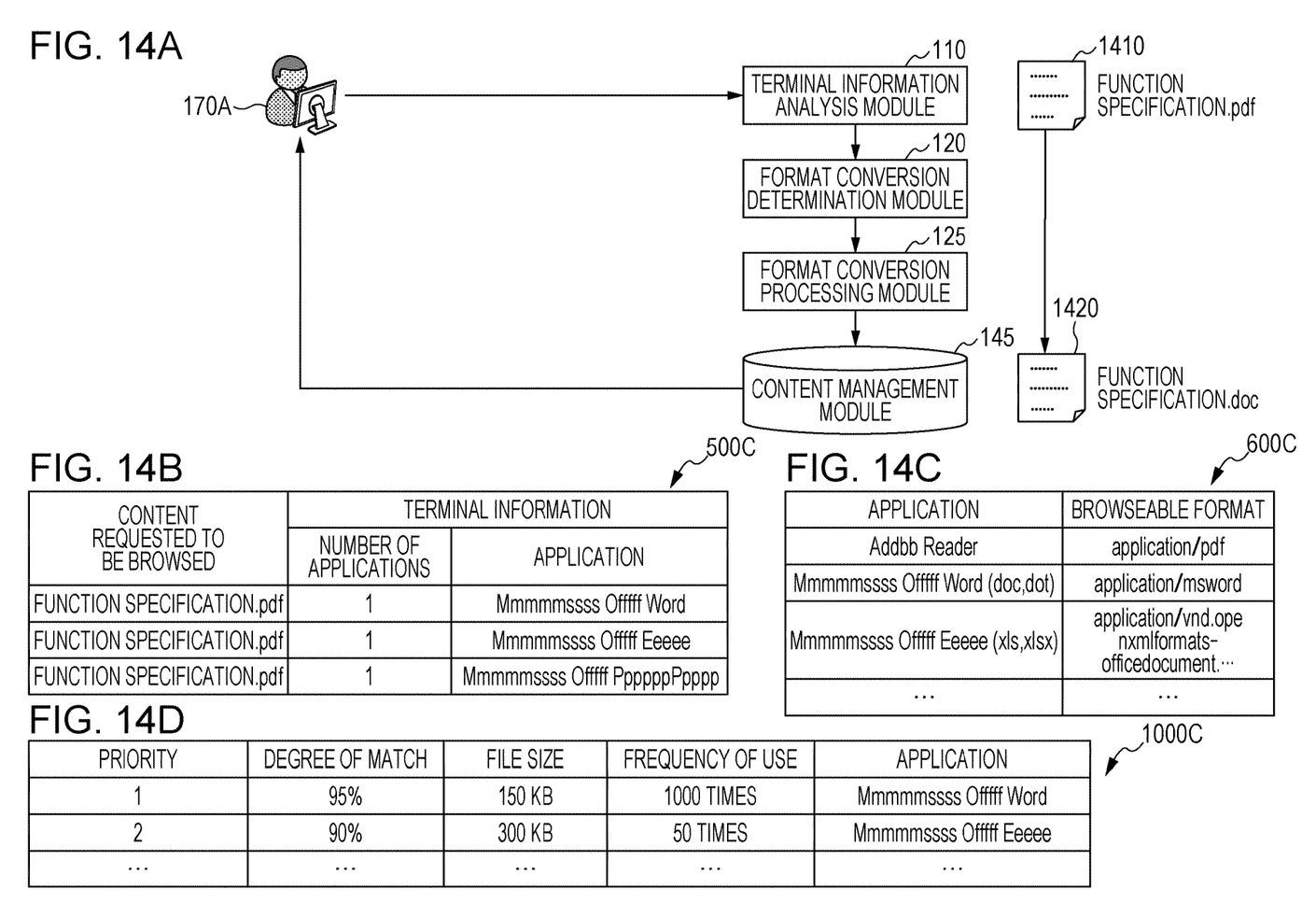
FIGS. 14A to 14D are diagrams illustrating an exemplary process according to the exemplary embodiment.

(14-1) As illustrated in the example in FIG. 14A, the user of the client terminal 170A tries to browse on the client terminal 170A the document "Function Specification. pdf: 1410" in the content management module 145. In this case, browsing request information 500C, illustrated in the example in FIG. 14B, is transmitted from the client terminal 170A to the terminal information analysis module 110.

(14-2) The terminal information analysis module 110 obtains application information of the client terminal 170A, extracts a browseable format from a format/application correspondence table 600C illustrated in the example in FIG. 14C, and gives the browseable format to the format conversion determination module 120.

(14-3) The format conversion determination module 120 determines that the client terminal 170A has no application for browsing the pdf document. From the degree of match before and after the conversion, the file size, and the frequency of use of each browsing application of the client terminal 170A, the format conversion determination module 120 creates a priority table 1000C illustrated in the example in FIG. 14C, and, since it is appropriate, on the basis of the priority, to browse the pdf document with Mmmmmssss Offfff Word on the client terminal 170A, determines to convert the "pdf" document to "doc", which serves as the format conversion method.

(14-4) The format conversion processing module 125 converts "Function Specification. pdf: 1410" to "Function Specification. doc 1420", and stores the converted doc document in the content management module 145.

(14-5) The information processing apparatus 100 transmits the conversion result "Function Specification. doc: 1420" to the client terminal 170A.

Figure 15:
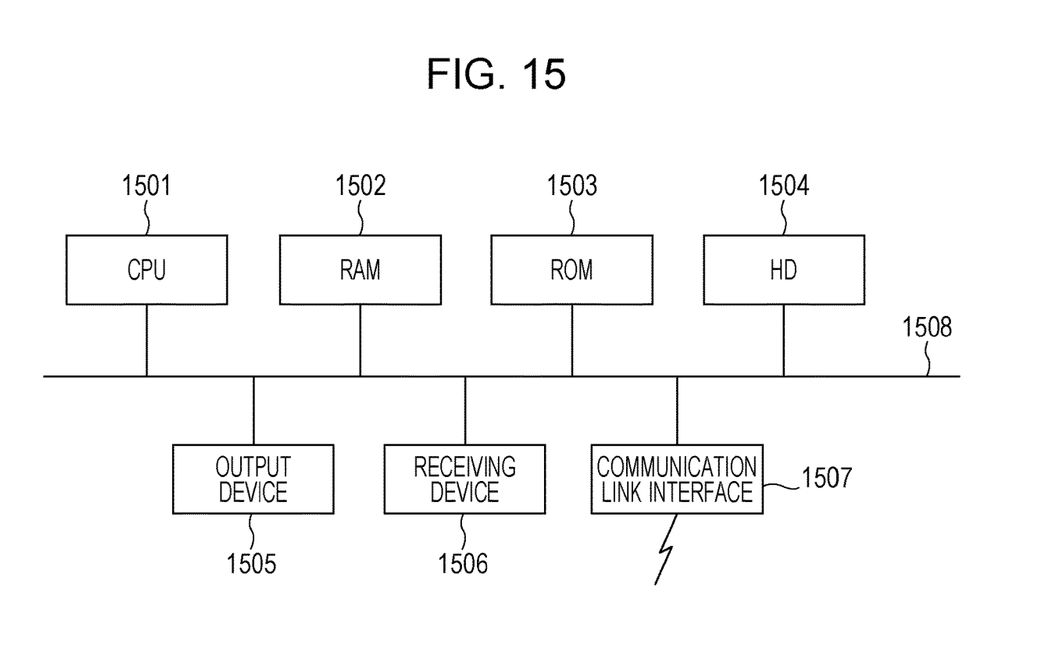
FIG. 15 is a block diagram illustrating an exemplary hardware configuration of a computer realizing the exemplary embodiment.

Note that the hardware configuration of a computer on which a program serving as the exemplary embodiment (information processing apparatus 100 or client terminal 170) is executed is a general computer, as illustrated in FIG. 15, and specifically is, for example, a computer that may be a personal computer or a server. In short, as a specific example, a CPU 1501 is used as a processor (arithmetic operation unit), and a RAM 1502, a read-only memory (ROM) 1503, and a hard disk (HD) 1504 are used as storage devices. As the HD 1504, for example, a hard disk drive (HDD) or a solid-state drive (SSD) may be used. The computer includes the CPU 1501 executing programs including the browsing request reception/terminal information obtaining module 105, the terminal information analysis module 110, the format conversion determination module 120, the format conversion processing module 125, the content image conversion module 135, the content transmission module 150, the user interface module 175, the document browsing module 180, the log obtaining/transmission module 185, the browsing request transmission/terminal information transmission module 190, and the content reception module 195, the RAM 1502 storing the programs and data, the ROM 1503 storing a program for activating the computer, the HD 1504 which is an auxiliary storage device (may be a flash memory) having the functions including the format information/application information management module 115, the application management module 130, the application operation management module 140, and the content management module 145, a receiving device 1506 which receives data based on a user operation performed with a keyboard, a mouse, a touchscreen, a microphone, or a camera (including a line-of-sight detection camera), an output device 1505 such as a cathode-ray tube (CRT), a liquid crystal display, or a loudspeaker, a communication link interface 1507 for connecting to a communication network such as a network interface card, and a bus 1508 that connects these components and enables these components to exchange data. Such computers may be connected to one another via a network.

Of the foregoing exemplary embodiment, for those made up of a computer program, software in the form of a computer program is made to be read into a system with the above hardware configuration, and the foregoing exemplary embodiment is realized by the cooperative action of the software and hardware resources.

Note that the hardware configuration illustrated in FIG. 15 illustrates a single exemplary configuration, and that the exemplary embodiment is not limited to the configuration illustrated in FIG. 15 insofar as the configuration still enables execution of the modules described in the exemplary embodiment. For example, some modules may also be realized with special-purpose hardware (such as an application-specific integrated circuit (ASIC), for example), and some modules may be configured to reside within an external system and be connected via a communication link. Furthermore, it may also be configured such that multiple instances of the system illustrated in FIG. 15 are connected to each other by a communication link and operate in conjunction with each other. Additionally, besides a personal computer in particular, the exemplary embodiment may also be incorporated into a device such as a mobile information/communication device which is a mobile terminal (including devices such as a mobile phone, a smartphone, mobile equipment, and a wearable computer), information home appliance, robot, photocopier, fax machine, scanner, printer, or multi-functional peripheral.

Note that the described program may be provided stored in a recording medium, but the program may also be provided via a communication medium. In this case, a "computer-readable recording medium storing a program", for example, may also be taken to be an exemplary embodiment of the present invention with respect to the described program.

A "computer-readable recording medium storing a program" refers to a computer-readable recording medium upon which a program is recorded, and which is used in order to install, execute, and distribute the program, for example.

The recording medium may be a Digital Versatile Disc (DVD), encompassing formats such as DVD-R, DVD-RW, and DVD-RAM defined by the DVD Forum and formats such as DVD+R and DVD+RW defined by DVD+RW Alliance, a compact disc (CD), encompassing formats such as read-only memory (CD-ROM), CD Recordable (CD-R), and CD Rewritable (CD-RW), a Blu-ray Disc (registered trademark), a magneto-optical (MO) disc, a flexible disk (FD), magnetic tape, a hard disk, read-only memory (ROM), electrically erasable and programmable read-only memory (EEPROM (registered trademark)), flash memory, random access memory (RAM), or a Secure Digital (SD) memory card, for example.

In addition, all or part of the above program may also be recorded to the recording medium and saved or distributed, for example. Also, all or part of the above program may be communicated by being transmitted using a transmission medium such as a wired or wireless communication network used in a local area network (LAN), a metropolitan area network (MAN), a wide area network (WAN), the Internet, an intranet, an extranet, or some combination thereof, or alternatively, by being modulated onto a carrier wave and propagated.

Furthermore, the above program may be part or all of another program, and may also be recorded to a recording medium together with other separate programs. The above program may also be recorded in a split manner across multiple recording media. The above program may also be recorded in a compressed, encrypted, or any other recoverable form.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor programmed to
    obtain information regarding a plurality of browsing programs stored in a user terminal that is external to the information processing apparatus, the user terminal trying to browse a document in a first document format;
    determine whether the first document format is browseable on any of the plurality of browsing programs of the user terminal; and
    convert the document to a second document format browseable with one of the browsing programs according to a priority, in response to determining that the first document format is not browseable on any of the plurality of browsing programs of the user terminal.

2. The information processing apparatus according to claim 1, wherein the processor converts the document to the second document format based on a degree of match between details of a pre-conversion document and details of a post-conversion document.

3. The information processing apparatus according to claim 1, wherein the processor converts the document to the second document format based on a size of a post-conversion document.

4. The information processing apparatus according to claim 1, wherein the processor converts the document to the second document format based on a frequency of use of the browsing program.

5. The information processing apparatus according to claim 1, wherein the processor determines the second document format using a combination of at least two of a degree of match between details of a pre-conversion document and details of a post-conversion document, a size of the post-conversion document, and a frequency of use of the browsing program.

6. A non-transitory computer readable medium storing a program causing a computer to execute a process, the process comprising:
    obtaining information regarding a plurality of browsing programs stored in a user terminal that is external to the computer, the user terminal trying to browse a document in a first document format;
    determining whether the first document format is browseable on any of the plurality of browsing programs of the user terminal; and
    converting the document to a second document format browseable with one of the browsing programs according to a priority, in response to determining that the first document format is not browseable on any of the plurality of browsing programs of the user terminal.

* * * * *